Nov. 27, 1962  J. B. NEWSOME  3,065,945
MOUNTING FOR ELECTRICAL DEVICE
Filed March 24, 1961  2 Sheets-Sheet 1

INVENTOR.
JOE B. NEWSOME
BY Walter M. Rodger
ATTORNEY

Nov. 27, 1962    J. B. NEWSOME    3,065,945
MOUNTING FOR ELECTRICAL DEVICE
Filed March 24, 1961    2 Sheets-Sheet 2

INVENTOR.
JOE B. NEWSOME
BY Walter M. Rodgers
ATTORNEY 3,065,945
MOUNTING FOR ELECTRICAL DEVICE
Joe B. Newsome, East Point, Ga., assignor to Southern States, Inc., a corporation of Georgia
Filed Mar. 24, 1961, Ser. No. 98,234
1 Claim. (Cl. 248—201)

This invention relates to mounting for electrical devices and more particularly to an arrangement for mounting a ground operated air break switch in cantilever fashion to a pole.

The current trend towards higher and higher voltages for electric systems together with the increase in use of pole mounted disconnecting switches have resulted in pole switches of such great weight that serious difficulties are encountered in hoisting the switch on to the pole and securing it in position thereon.

A principal object of this invention is to provide improved mounting means for mounting in cantilever fashion a heavy electric switch atop a pole.

Another object of the invention is to provide an improved method whereby heavy switches may be mounted in cantilever fashion on an electric pole.

The invention in one form comprises a plurality of support brackets secured atop a pole in fixed vertically spaced relation, a fixed mounting pad secured to each bracket, the pads being vertically aligned, a plurality of mounting pads secured to the switch and arranged in complementary relation to the fixed pads on the pole, and one or more hook-like support arms secured in fixed relation to the switch base and arranged to engage the upper one of the mounting pads secured to the pole so as to take the weight of the cantilever switch after it is mounted on to the pole and while the lineman is bolting the complementary mounting pads together.

Figure 1:
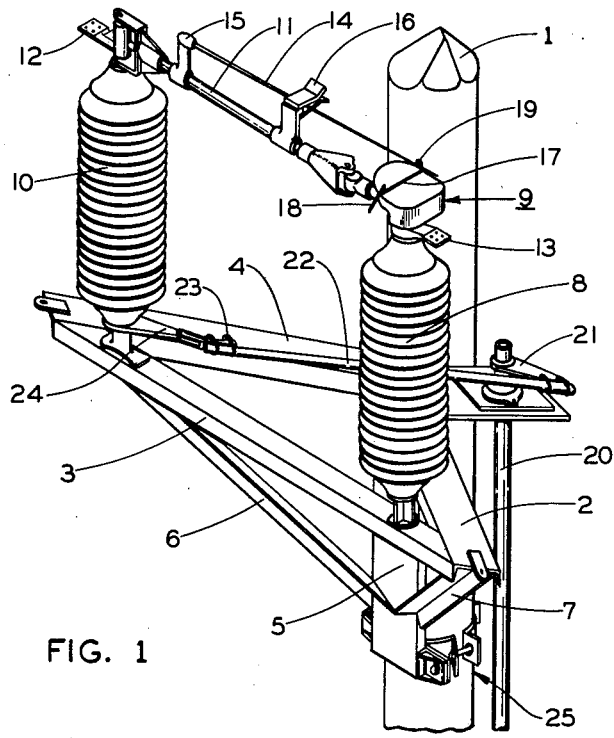
Figure 2:
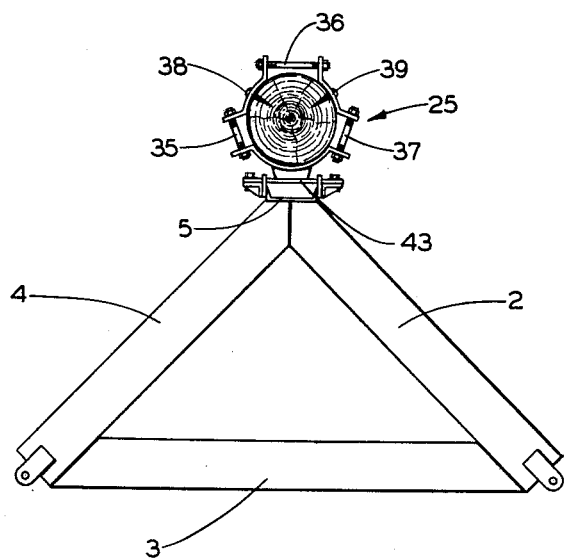
Figure 3:
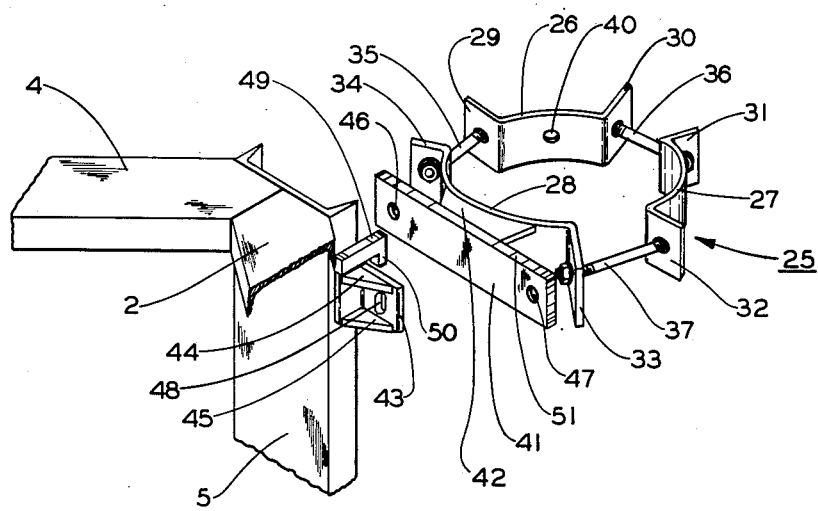
Figure 4:
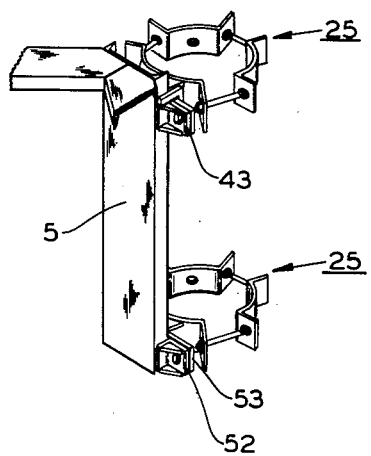

For a better understanding of the invention reference may be had to the following detailed description taken in conjunction with the accompanying drawings in which FIG. 1 is a perspective view of a pole mounted switch of the type to which the invention is particularly applicable; FIG. 2 is a plan view of the structure shown in FIG. 1 but with the live switch parts and insulators removed and with the pole itself shown in conjunction with the mounting means which interrelates the switch base and the pole; FIG. 3 is an exploded perspective view showing the mounting means depicted in FIG. 2; and in which FIG. 4 is a view similar to FIG. 3 but which shows a pair of spaced fastening elements which ordinarily would be used in connection with the mounting of a switch such as is depicted in FIG. 1.

With reference to FIG. 1, the numeral 1 is used to designate the pole. Secured to pole 1 by means best illustrated in FIGS. 2–4 inclusive is a frame of metal channels 2, 3 and 4 whose ends are welded together to form a triangular configuration. Vertically disposed channel 5 is secured at its upper end to the adjacent ends of channels 2 and 4 by welding or other suitable means and a pair of braces 6 and 7 are welded to the other vertices of the triangle comprising channels 2–4 and the lower ends of braces 6 and 7 are welded or otherwise secured to the lower end of channel 5 to form a sturdy supporting frame for the switch itself and its operating mechanism. Secured to one end of channel 3 is a fixed insulator 8 to the top end of which a fixed jaw contact structure generally designated by the numeral 9 is mounted. Secured to the other end of channel 3 is a rotatable insulator 10 to which the rotatable switch blade 11 is fixedly secured. As is well known in the art, switch blade 11 swings into and out of engagement with the fixed jaw contacts generally designated by the numeral 9. A terminal 12 is mounted atop insulator 10 in movable relation to switch blade 11 and another terminal 13 is fixedly secured atop the insulator 8. Thus the circuit through the switch comprises terminal 12, switch blade 11, jaw contacts 9 and terminal 13.

For the purpose of preventing burning of the main contacts 9 and 11 the switch blade 11 is provided in known fashion with a switch blade conducting attachment designated by the numeral 14 which is mounted on a pedestal 15 secured to switch blade 11. Flexible conducting element 14 is guided by a pair of jaws 16 which are secured to the switch blade 11 and the other end of flexible conductor 14 engages a hooked conductor 17 mounted atop the jaw contacts 9 and in electrical contact therewith. As is shown in FIG. 1 contact 17 is provided at one end with a projecting tip portion 18 and at the other end with an upwardly projecting stop portion 19, the functions of which are well known in the art. Thus as the switch blade 11 swings to the open position, in a clockwise direction as viewed in FIG. 1, the blade 11 disengages the jaw contact 9. Thereafter the jaws 16 move out of engagement from the flexible conductor 14 and finally the circuit is interrupted when the flexible conductor 14 disengages the contact 17.

For the purpose of rotating rotatable insulator 10 a rotatable operating rod 20 is journally supported in known fashion to the switch mechanism. Fixedly secured atop the operating rod 20 is a crank 21 to the outer end of which a rod 22 is pivotally connected. Rod 22 is pivotally connected at 23 to a crank 24 which is securely affixed to and rotatable with the insulator stack 10. Thus rotation of rod 20 in a clockwise direction as viewed from above results in movement towards the left of rod 22 and thereby results in clockwise rotation of insulator stack 10 and in opening movement of blade 11.

The mounting structure whereby the switch is secured atop the pole 1 is best shown in FIGS. 2–4 inclusive. This structure comprises a plurality of support brackets generally designated in the drawing by the numeral 25. While any suitable structure may be used for support brackets 25 a desirable construction comprises a plurality of arcuate clamping elements 26, 27 and 28 which are provided with outwardly bent end portions designated in the drawing by the numerals 29–34 inclusive. These outwardly bent end portions are interconnected by bolts designated in the drawings by the numerals 35, 36, and 37 to the ends of which suitable nuts are threadedly secured. Thus by means of the nuts and bolts 35, 36 and 37, the support brackets comprising these bolts and the arcuate clamping elements 26, 27 and 28 are securely fastened about the pole as best shown in FIG. 2. After the support bracket as above described is mounted on the pole 1, its relationship to the pole may be securely fixed by simply driving spikes 38 and 39 into the pole 1 as best shown in FIG. 2. As can best be seen in FIGS. 3 and 4 the spike 38 may extend through an opening 40 provided for that purpose and of course the spike 39 would extend through a suitable opening not shown but which would be formed in arcuate collar element 27.

For the purpose of providing support engaging means for the switch, a fixed mounting pad 41 is secured to the outer surface of arcuate clamping element 28. Preferably the fixed mounting pad 41 is welded to a pair of spaced gusset elements which are disposed between the arcuate bracket 28 and the mounting pad 41 and which are welded thereto. Only one such element is depicted in FIG. 3 and is designated by the numeral 42. Thus it will be understood that the fixed mounting pad 41 is securely affixed to the support bracket 25. The two support brackets depicted in FIG. 4 and designated generally by the numeral 25 are identical in construction. For an unusually large switch, more than two such support brackets would be used, such, for example, as three or four.

As is best shown in FIG. 3, vertical channel 5 is provided with a mounting pad 43 which preferably is welded in position to the flanges of the channel 5 and preferably reinforcing metallic triangles 44 and 45 are welded to the outer surfaces of the flanges of channel 5 and to the ends of mounting pad 43 so as to provide additional support thereto.

As can be seen best in FIGS. 3 and 4, the outer ends of the fixed mounting pad 41 are provided with a pair of holes 46 and 47. Furthermore as is best shown in FIG. 3 the near end of the mating mounting pad 43 is provided with an opening 48. With the mating mounting pad 43 in engagement with the fixed mounting pad 41, it is possible to insert a bolt or other fastening element through the holes 47 and 48 and to secure such elements into position. Of course a similar holding element would be disposed in the hole 46 and the complementary hole formed in the adjacent end of the mating mounting pad 43.

It will be understood that a mating mounting pad 52 is disposed opposite the lower mounting bracket 25 and cooperates therewith in the same manner as is described above.

Since the switch mechanism is quite heavy, and in order to provide controlled support therefor while the parts are being precisely positioned so as to align holes such as 47 and 48, the support arm 49 is provided and is constructed so that its extremity is hook-like in shape as is indicated by the numeral 50. As depicted in FIG. 3, the support arm 49 is welded alongside a flange of channel 5 and also to the triangle 44 and to the upper edge of mounting pad 43. The hook-like end portion 50 extends toward the mounting pad 41 a distance at least equivalent to the thickness of the mounting pad 41 so that the support arm 49 when the switch is hoisted up into position may extend over the upper edge 51 of the mounting pad 41. The hook 50 secures the support 49 against downward and outward swinging movement. With the support arm 49 secured adjacent the upper mounting pad 43, it is obvious that the lower mounting pad 52 as best shown in FIG. 4 is then in abutting relation to the lower fixed mounting pad 53. As thus disclosed the switch may then be adjusted horizontally from right to left until the holes 48 and 47 and all the other holes become aligned so that holding bolts 54 may then be secured in position in holes 47 and 48 and in the other holes in the mounting pads. Horizontal adjustment is very limited, however, due to the fact that gusset element 42 is of a width but slightly less than the horizontal spacing between supports 49.

In the mounting of a heavy switch such as is shown in FIG. 1, it is preferable to secure the support brackets 25 in position near the top of the pole 1 before the pole is erected. Of course, the spacing along the axis of the pole is determined by the already determined vertical spacing between the mounting pads 43 and 52 secured to vertical channel 5 of the switch base. The support brackets are angularly disposed relative to the pole axis and to each other so that the mounting pads 41 and 53 are aligned in the same plane and so that their openings such as 46 and 47 are in substantial alignment. After the support brackets are mounted on the pole, the pole is then erected. Subsequently the switch structure depicted in FIG. 1 is hoisted in position by suitable block and tackle means in known manner and the support arm 49 is arranged so that its hook portion 50 rides over the upper edge 51 of the upper mounting pad 41. Thereafter the switch is lowered slightly to secure it in place and the lineman then proceeds to make minor lateral adjustments to align the holes in the mounting pads 41 and 43 and thereafter holding bolts 54 are secured in the mounting holes such as 47 and 48 as described in detail above.

While I have shown and described a particular embodiment of the invention and a particular method of mounting a switch according to the invention, I do not wish to be limited thereto and intend in the appended claim to cover all such changes and modifications as fall within the true spirit and scope of the invention.

What I claim as new and desire to secure by Letters Patent of the United States is:

A support for mounting an electrical device in cantilever fashion on a pole, said support comprising a plurality of support brackets secured to the pole in fixed vertically spaced relation, a gusset element affixed to each bracket, a fixed mounting pad secured to each gusset, said pads being in vertical alignment, a plurality of mating mounting pads secured to the device and arranged in complementary relation to said fixed pads, and a pair of horizontally spaced hook-like support arms secured in fixed relation to the device adjacent an upper mounting pad and having their hook-like portions adapted to extend loosely over a part of the associated fixed mounting pad so as to allow relative sidewise adjustment of the position of said device and its mounting pads relative to the pole and the mounting pads mounted thereon, the width of said gusset element being but slightly less than the horizontal spacing between said support arms so as to position said fixed and mating pads in approximately the proper relationship to each other, and holes in said fixed and mating pads for receiving fastening elements, corresponding ones of said holes being in the same horizontal plane and being adapted for vertical alignment by sidewise adjustment of the device and its mounting pads relative to the pole and its mounting pads.

References Cited in the file of this patent

UNITED STATES PATENTS

| | | |
|---|---|---|
| 1,896,740 | Cosseboom | Feb. 7, 1933 |
| 1,928,017 | Hammel | Sept. 26, 1933 |
| 2,106,602 | Hunter | Jan. 25, 1938 |
| 2,114,876 | Forbes | Apr. 19, 1938 |
| 2,642,249 | Samuels | June 16, 1953 |
| 2,841,353 | Burdick | July 1, 1958 |
| 2,910,261 | Ward | Oct. 27, 1959 |